(12) United States Patent
Choi

(10) Patent No.: US 9,533,566 B2
(45) Date of Patent: Jan. 3, 2017

(54) APPARATUS AND METHOD FOR CONTROLLING ACTIVE AIR FLAP

(71) Applicant: Hyundai Motor Company, Seoul (KR)

(72) Inventor: Seung Ho Choi, Uiwang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/570,148

(22) Filed: Dec. 15, 2014

(65) Prior Publication Data

US 2016/0101682 A1   Apr. 14, 2016

(30) Foreign Application Priority Data

Oct. 10, 2014   (KR) .................. 10-2014-0136755

(51) Int. Cl.
| | |
|---|---|
| G06F 7/00 | (2006.01) |
| B60R 22/00 | (2006.01) |
| E05F 15/00 | (2015.01) |
| G05D 1/00 | (2006.01) |
| G05D 3/00 | (2006.01) |
| G06F 17/00 | (2006.01) |
| F01P 7/02 | (2006.01) |
| B60K 11/08 | (2006.01) |
| G01S 19/14 | (2010.01) |
| B60K 11/04 | (2006.01) |

(52) U.S. Cl.
CPC .............. *B60K 11/085* (2013.01); *G01S 19/14* (2013.01); *B60K 11/04* (2013.01); *B60K 11/08* (2013.01)

(58) Field of Classification Search
None
See application file for complete search history.

(56) References Cited

U.S. PATENT DOCUMENTS

| | | | | |
|---|---|---|---|---|
| 2006/0211364 | A1* | 9/2006 | Brotz .................... | B60K 11/08 454/261 |
| 2007/0261648 | A1* | 11/2007 | Reckels ................. | F01P 7/167 123/41.12 |
| 2008/0185125 | A1* | 8/2008 | Prior ..................... | B60K 11/04 165/86 |
| 2011/0288717 | A1* | 11/2011 | Yu ........................ | B60K 11/085 701/31.4 |

(Continued)

FOREIGN PATENT DOCUMENTS

| | | |
|---|---|---|
| JP | 2011-31842 A | 2/2011 |
| JP | 2013-28209 A | 2/2013 |

(Continued)

*Primary Examiner* — Yonel Beaulieu
*Assistant Examiner* — Lail Kleinman
(74) *Attorney, Agent, or Firm* — Morgan, Lewis & Bockius LLP

(57) ABSTRACT

A method of controlling an active air flap, includes detecting a location of a vehicle from a GPS signal received through a GPS receiver, and acquiring a road surface gradient of a road on which the vehicle travels from location information of the vehicle and map information stored in a data storage, by a controller, determining an opening degree setting value corresponding to the road surface gradient of the road, by the controller, outputting a control signal for controlling an opening degree of an air flap according to a setting value, by the controller, and controlling the opening degree of the air flap by operating an actuator according to the control signal.

10 Claims, 5 Drawing Sheets

(56) References Cited

U.S. PATENT DOCUMENTS

2015/0343892 A1* 12/2015 Kolhouse ............. B60K 11/085
165/287

FOREIGN PATENT DOCUMENTS

| | | |
|---|---|---|
| JP | 2013-79046 A | 5/2013 |
| KR | 10-2011-0026845 A | 3/2011 |
| KR | 10-2012-0035120 A | 4/2012 |
| KR | 10-1219706 B1 | 1/2013 |
| KR | 10-1240975 B1 | 3/2013 |
| WO | WO 2012/005077 A1 | 1/2012 |

* cited by examiner

| Road surface gradient (degree) | -10 | -5 | -3 | -1 | 0 | 1 | 3 | 5 | 10 |
|---|---|---|---|---|---|---|---|---|---|
| Opening degree of flap | 0 | 0 | 15 | 35 | 50 | 70 | 85 | 100 | 100 |
| Opening state (calculated) | Full Closed | Full Closed | 15% Open | 35% Open | 50% Open | 70% Open | 85% Open | Full Open | Full Open |

| Exterior air temperature; Road surface gradient [℃] | -10 | -5 | 0 | 5 | 10 | 15 | 20 | 25 | 30 |
|---|---|---|---|---|---|---|---|---|---|
| Opening degree of flap | 0 | 0 | 0 | 50 | 100 | 100 | 100 | 100 | 100 |
| Opening state (calculated) | Full Closed | Full Closed | Full Closed | 50% Open | Full Open | Full Open | Full Open | Full Open | Full Open |

| Vehicle speed [KPH] | 0 | 10 | 20 | 30 | 40 | 50 | 60 | 70 | 80 |
|---|---|---|---|---|---|---|---|---|---|
| Opening degree of flap | 100 | 100 | 100 | 100 | 100 | 85 | 50 | 25 | 0 |
| Opening state (calculated) | Full Open | Full Open | Full Open | Full Open | Full Open | 85% Open | 50% Open | 25% Open | Full Closed |

FIG. 6

| Intake air negative pressure [~mmAq] | 0 | 50 | 100 | 150 | 200 | 250 | 300 | 350 | 400 |
|---|---|---|---|---|---|---|---|---|---|
| Opening degree of flap | 100 | 100 | 100 | 100 | 100 | 85 | 50 | 25 | 0 |
| Opening state (calculated) | Full Open | Full Open | Full Open | Full Open | Full Open | 85% Open | 50% Open | 25% Open | Full Closed |

FIG. 7

| Vehicle speed [KPH] | 0 | 10 | 20 | 30 | 40 | 50 | 60 | 70 | 80 |
|---|---|---|---|---|---|---|---|---|---|
| Opening degree of flap | 100 | 100 | 100 | 100 | 100 | 85 | 50 | 25 | 0 |
| Opening state (calculated) | Full Open | Full Open | Full Open | Full Open | Full Open | 85% Open | 50% Open | 25% Open | Full Closed |

FIG. 8

# APPARATUS AND METHOD FOR CONTROLLING ACTIVE AIR FLAP

CROSS-REFERENCE TO RELATED APPLICATION

The present application claims priority to Korean Patent Application No. 10-2014-0136755 filed on Oct. 10, 2014, the entire contents of which is incorporated herein for all purposes by this reference.

BACKGROUND OF THE INVENTION

Field of the Invention

The present invention relates to an apparatus and a method for controlling an active air flap. More particularly, it relates to an apparatus and a method for controlling an active air flap, through which cooling performance and aerodynamic performance can be improved and fuel ratio can be maximized by reflecting information of a road.

Description of Related Art

In general, various heat exchangers such as a radiator, an intercooler, an evaporator, and condensers as well as components for driving an engine are provided in an engine room of the vehicle.

Heat exchange media circulate in the heat exchangers to be cooled or heat-dissipated as the heat exchange media in the heat exchangers exchange heat with exterior air.

Accordingly, exterior air should be smoothly supplied into an engine room to stably operate various heat exchangers in the engine room of the vehicle.

However, if a large amount of exterior air is introduced at a high speed when the vehicle travels at a high speed, air resistance becomes larger and fuel ratio of the vehicle deteriorates.

In order to solve the problems, an active air flap (AAF) apparatus which increases an amount of air introduced into an engine room by increasing an opening angle when the vehicle travels at a low speed and decreases an amount of introduced air by decreasing the opening angle when the vehicle travels at a high speed, thereby helping improve aerodynamic performance and enhance fuel ratio is being applied.

Such an active air flap is installed at a location of a vehicle where exterior air is introduced, and actively controls an amount of introduced air by varying an opening degree of an air inlet passage according to a driving condition of the vehicle.

As shown in FIGS. 1 and 2, the active air flap apparatus includes a duct 2 coupled to and installed in a front end module 1 of a vehicle, for guiding flow of air, a housing 3 coupled to and installed in the duct 2, an actuator 4 fixedly installed in the housing 3, and an air flap 6 rotatably installed in the housing 3 and rotated by power of the actuator 4, for opening and closing an air inlet passage 5 of the housing 3.

Here, the actuator 4 includes a motor and a plurality of gear members (reduction gears), and rotary shafts 7 which are rotatable with respect to the housing 3 are installed at opposite sides of the actuator 4.

The gear members are connected to the rotary shafts such that power may be transmitted to the rotary shafts and air flaps 6 are integrally coupled to the rotary shafts 7 such that if the actuator 4 is operated, the rotary shafts 7 are rotated and the air flaps 6 are rotated at the same time so that the air inlet passage 5 of the housing 3 can be opened and closed.

Meanwhile, in the active air flap apparatus according to the according to the related art, only an opening degree of the air flap is controlled according to a temperature of exterior air and a speed of a vehicle but parameters for controlling the opening degree are not classified, and in particular, because information of the driving road is not reflected, cooling performance, aerodynamic performance, and fuel ratio cannot be effectively improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling an active air flap, through which cooling performance and aerodynamic performance can be improved and fuel ratio can be maximized by reflecting information of a road.

In accordance with an aspect of the present invention, there is provided an apparatus for controlling an active air flap, the apparatus including a GPS receiver for receiving a global positioning system (GPS) signal, a data storage in which map information is stored, a controller for detecting a vehicle location from the GPS signal received through the GPS receiver, acquiring a gradient of a road surface corresponding to the vehicle location from the map information, and outputting a control signal for setting an opening degree of an air flap to a setting value according to the gradient of the road surface, and an actuator for actuating the air flap according to the control signal of the controller.

In accordance with another aspect of the present invention, there is provided a method of controlling an active air flap, which may include detecting a location of a vehicle from a GPS signal received through a GPS receiver, and acquiring a road surface gradient of a road on which the vehicle travels from location information of the vehicle and map information stored in a data storage, by a controller, determining an opening degree setting value corresponding to the road surface gradient of the road, by the controller, outputting a control signal for controlling an opening degree of an air flap according to a setting value, by the controller, and controlling the opening degree of the air flap by operating an actuator according to the control signal.

According to the present invention, an operation of an active air flap for controlling an amount of introduced air (cooling air) and maintaining an optimum temperature of an engine is controlled according to information of a driving road, and accordingly, travel air resistance can be minimized, optimum cooling performance can be secured, driving loss of a cooling fan can be minimized, and fuel ratio can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a block diagram showing a configuration of an apparatus for controlling an active air flap according to an exemplary embodiment of the present invention.

FIG. 4, FIG. 5, FIG. 6, FIG. 7, and FIG. 8 are views exemplifying map data in which opening degrees are set according to parameter values according to an exemplary embodiment of the present invention.

Figure 1:
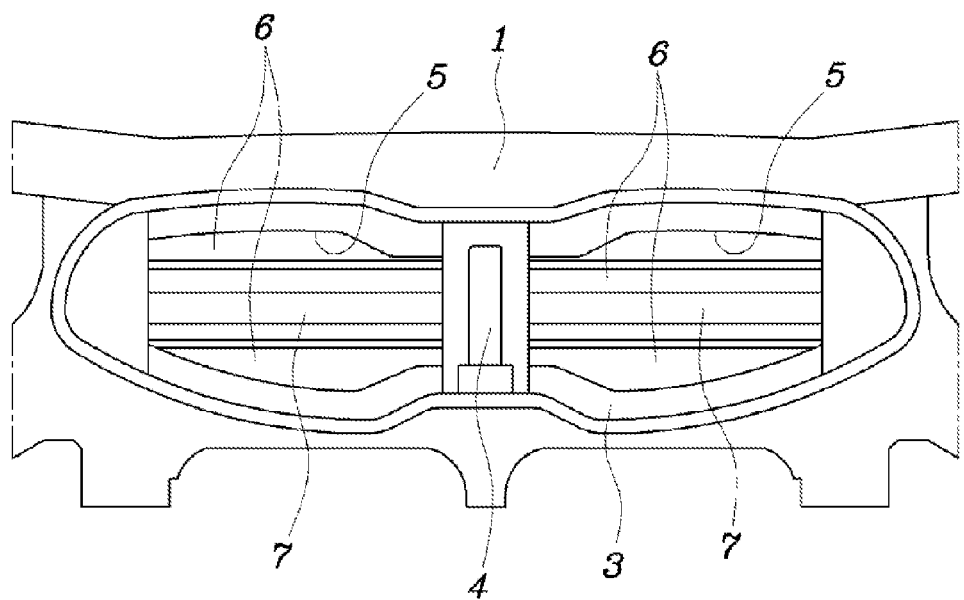
FIG. 1 and FIG. 2 are views for explaining an active air flap.
Figure 2:
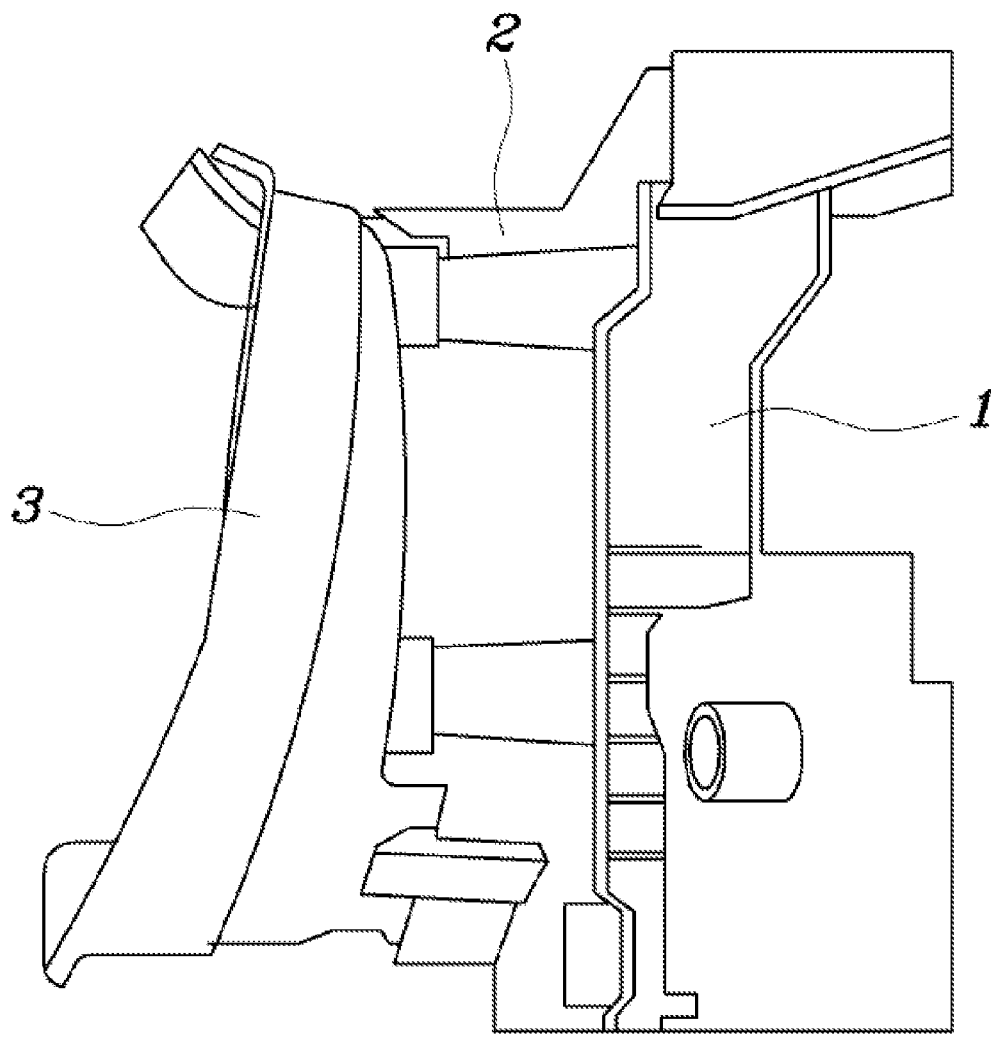

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a method for controlling an active air flap, through which cooling performance and aerodynamic performance can be improved and fuel ratio can be maximized by reflecting information of a road.

According to an exemplary embodiment of the present invention, an operation of an active air flap for controlling an amount of introduced air (cooling air) and maintaining an optimum temperature of an engine is controlled according to information of a driving road, and accordingly, travel air resistance can be minimized, optimum cooling performance can be secured, driving loss of a cooling fan can be minimized, and fuel ratio can be improved.

Figures 3, 4, 5:
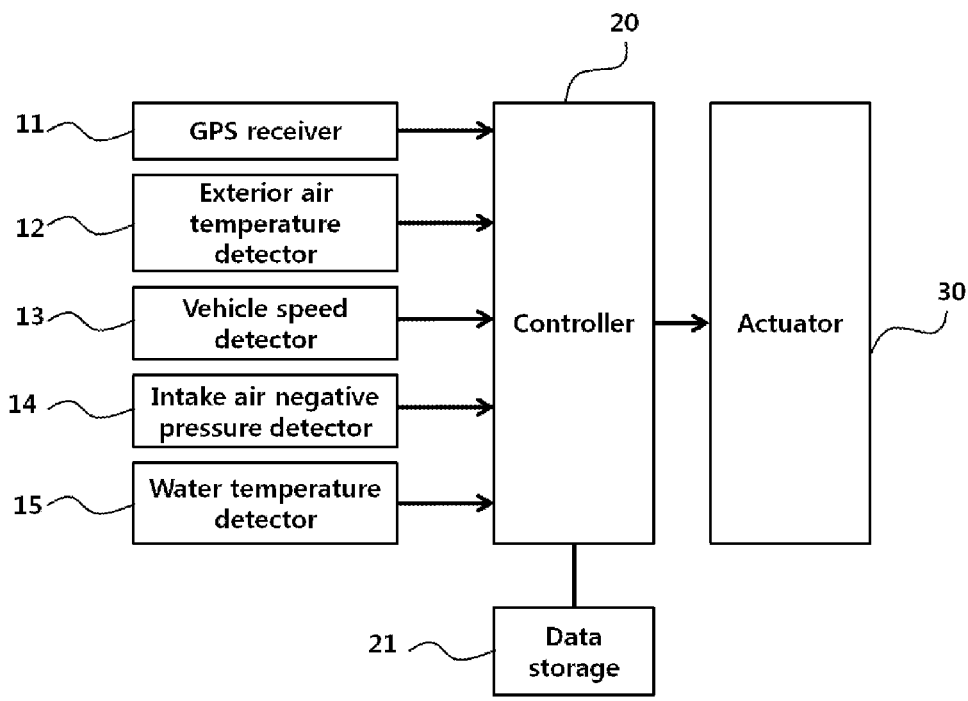

FIG. 3 is a block diagram showing a configuration of an apparatus for controlling an active air flap according to an exemplary embodiment of the present invention.

First, the apparatus for controlling an active air flap according to an exemplary embodiment of the present invention includes: a GPS receiver 11 for receiving a global positioning system (GPS) signal, a data storage 21 in which map information is stored, a controller 20 for detecting a vehicle location from the GPS signal received through the GPS receiver 11, acquiring a gradient of a road surface corresponding to the vehicle location from the map information, and outputting a control signal for setting an opening degree of an air flap to a setting value according to the gradient of the road surface, and an actuator 30 for actuating the air flap according to the control signal of the controller 20.

The apparatus for controlling an active air flap according to an exemplary embodiment of the present invention may further include: at least one of an exterior air temperature detector 12 for detecting a temperature of exterior air, a vehicle speed detector 13 for detecting a vehicle speed, an intake air negative pressure detector 14 for detecting a negative pressure of intake air, and a water temperature detector 15 for detecting a temperature of cooling water.

Here, the exterior air temperature detector 12 and the water temperature detector 15 may be temperature sensors for detecting a temperature of exterior air (the atmospheric air) and a temperature of cooling water, and the intake air negative pressure detector 14 may be a pressure sensor installed in an intake manifold of an engine.

The GPS signal received through the GPS receiver 11 and map information stored in the data storage 21 are used to acquire information of a road on which the vehicle travels, in particular, road surface gradient (inclination) information of an uphill road and a downhill road.

That is, the vehicle location may be detected from the GPS signal, and the road surface gradient information of the road on which the vehicle travels may be acquired from the vehicle location information detected from the GPS signal and the map information stored in the data storage 21.

The map information provides three-dimensional geometric information, that is, three-dimensional road information including altitude information in addition to a two-dimensional plane, and may be general 3D map data for providing road surface gradient information of roads.

A surface road gradient of a road may be obtained from altitude information of the road on which a vehicle travels through a calculation equation, which will be described below.

When an opening degree of an air flap is controlled according to road surface gradients of an uphill road and a downhill road as described above, an optimum cooling air flow control and an optimum engine temperature control on which characteristics of a travel road are reflected can be achieved. Further, air resistance can be minimized, cooling performance can be maximized, driving loss of a cooling fan can be minimized, and fuel ratio can be improved.

FIG. 4 is a view exemplifying map data in which setting values for opening degrees of an air flap are defined according to road surface gradients. In the exemplary embodiment of the present invention, if a road surface gradient of a road on which a vehicle travels is obtained, an opening degree setting value corresponding to the road surface gradient is obtained from the map data and an opening degree of an air flap may be controlled according to the obtained setting value.

In more detail, cooling performance is maximally secured by opening an air flap on an uphill road, and accordingly fuel ratio can be improved by minimizing driving loss of a cooling fan (a radiator cooling fan or the like).

Then, an opening degree (an amount of opening) of the air flap is variably controlled to a setting value of map data according to a road surface gradient (corresponding to a positive value), and as shown in FIG. 4, an opening degree is set to a larger value as the road surface gradient becomes larger such that an opening degree of the air flap further increases and the air flap is fully opened on an uphill road having a large road surface gradient of a first reference gradient (for example, 5 degrees) or more.

Meanwhile, travel air resistance is minimized by closing the air flap on a downhill road of a rapid inclination on which the absolute value of the road surface gradient (a negative value) is equal to or more than the absolute value of a second gradient (for example, −5 degrees), and accordingly, fuel ratio is improved.

Then, the air flap is fully closed to minimize travel air resistance on a downhill road on which the absolute value of a road surface gradient is equal to or more than the absolute value of the second reference gradient, and the air flap is opened on a downhill road of an inclination smaller than the absolute value of the second reference gradient by an opening degree smaller than that of the uphill road.

Here, on a downhill road of a road surface gradient less than the absolute value of the second reference gradient, an opening degree of the air flap is variably controlled to a setting value according to the road surface gradient, and the opening degree of the air flap is further increased by setting the setting value of the opening degree to be larger as the absolute value of the road surface gradient becomes smaller.

According to an exemplary embodiment of the present invention, parameters for controlling an opening degree of an air flap may be one or more parameters selected from an exterior air temperature detected by the exterior air temperature detector 12, a vehicle speed detected by the vehicle speed detector 13, an intake air negative pressure detected by the intake air negative pressure detector 14, and a cooling water temperature detected by the water temperature detector 15.

To this end, map data in which opening degree setting values of the air flap according to the parameters are defined may be used, and FIGS. 5 to 8 are views exemplifying map data in which opening degree setting values according to the parameter values of FIGS. 5 to 8 are set.

First, because an engine should be promptly warm up and cooling performance should be secured in the winter season in which an exterior air temperature is low, inflow of air is interrupted by fully closing the air flap in a low temperature condition corresponding to a temperature of the first reference temperature (for example, 0° C.) or less, the air flap is fully opened such that air can be maximally introduced during driving of the vehicle in a condition corresponding to a temperature of the second reference temperature (for example, 10° C.) or more, and the opening degree of the air flap is controlled to a setting value of the map data according to an exterior air temperature in a condition corresponding to a temperature of more than the first reference temperature and less than the second reference temperature (here, the first reference temperature<the second reference temperature).

In relation to vehicle speed, when the current vehicle speed is a high speed of the first reference speed (for example, 80 KPH) or more, travel air resistance is minimized by fully closing the air flap, and accordingly, fuel ratio is improved.

Here, when the current vehicle speed is less than the first reference speed and more than the second reference speed (for example, 40 KPH), the opening degree of the air flap is variably controlled to a setting value of the map data according to the vehicle speed, and as the vehicle speed becomes higher, the setting value for an opening degree is set to be smaller so that an opening degree of the air flap becomes smaller (here, the second reference speed<the first reference speed).

Further, when the current vehicle speed is less than the second reference speed, the air flap is controlled to be fully closed.

The opening degree of the air flap also may be controlled according to an intake air negative pressure representing a contamination degree of a road, the air flap is fully closed when the vehicle travels on a severely contaminated road on which an intake air negative pressure (which is a negative pressure value (−mmAq) and an absolute value of which is the reference value) is equal to or more than the first reference pressure (for example, 400).

In this way, when the vehicle travels on a severely contaminated road surface such as a construction section or an unpaved road, foreign substances can be prevented from being introduced into and deposited on a cooling module including a cooling fan and a heat exchanger, by closing the air flap (the cleanness of the cooling module is maintained), and accordingly, lowering of the fluidity of air and deterioration of fuel ratio can be prevented.

When an intake air negative pressure is used, the air flap is fully closed if the intake air negative pressure is the first reference pressure or more and the opening degree of the air flap is variably controlled to a setting value of the map data according to the intake pressure negative pressure, and the opening degree of the air flap is decreased as the contamination degree of the intake air negative pressure is severe, by setting the opening degree setting value of the air flap to be smaller as the intake air negative pressure increases in the map data.

Further, when the vehicle travels on a clean road where the intake air negative pressure is the second reference pressure or less, the air flap is fully opened.

Furthermore, an optimum engine efficiency should be obtained by maintaining the engine at a suitable temperature, and an amount of introduced air should be increased to prevent the engine from being overheated when the temperature of the cooling water is high.

Further, when the engine needs to be rapidly warmed up while the temperature of the cooling water is low, an amount of introduced air should be reduced.

Accordingly, it is necessary to control the air flap according to the temperature of the cooling water.

For example, as shown in FIG. 8, when the temperature of the cooling water is as low as a third reference temperature (for example, 60° C.) or less, the air flap is fully closed, and when the temperature of the cooling water is as high as a fourth reference temperature (for example, 95° C.) or more, the air flap is fully opened (here, the third reference temperature<the fourth reference temperature).

Further, in a condition in which the temperature of the cooling water is more than the third reference temperature and less than the fourth reference temperature, the opening degree of the air flap is variably controlled to a setting value of the map data according to the temperature of the cooling water, and the setting value for the opening degree of the air flap is set to a larger value as the temperature of the cooling water increases in the map data.

That is, as the temperature of the cooling water increases, the opening degree of the air flap is controlled to have a larger value.

Meanwhile, although it has been described that the opening degree of the air flap is determined from the map data according to at least one detection value selected from the temperature of exterior air, intake air negative pressure, and the temperature of cooling water together with the gradient of a road surface, opening degree setting values of the map data according to the parameter values are different when at least one parameter together with the gradient of the road surface are applied.

Accordingly, when a plurality of detection information elements are applied as parameters, a maximum value of the opening degree setting values obtained from the map data is determined as a final setting value.

In the map data, the fully opened state refers to an opening degree of 100% and the fully closed state refers to an opening degree of 0%.

For example, an opening degree setting value obtained from the map data according to a road surface gradient of the current road and an opening degree setting value obtained from the map data according to a temperature of exterior air are compared such that the larger value is determined as a final setting value, and an operation of the air flap is controlled such that the opening value corresponding to the determined final setting value is represented.

That is, if the opening degree setting value obtained according to the road surface gradient corresponding to 100%, that is, a fully opened state, and the opening degree setting value obtained from the map data according to the temperature of exterior air is 50%, the air flap is fully opened.

In another example, the opening values of the air flap according to the road surface gradient, the temperature of exterior air, and the vehicle speed are 70%, 50%, and 85%, respectively, 80% is determined as the final opening degree setting value and the operation of the air flap is controlled such that an opening degree of 80% is represented.

Figure 9:
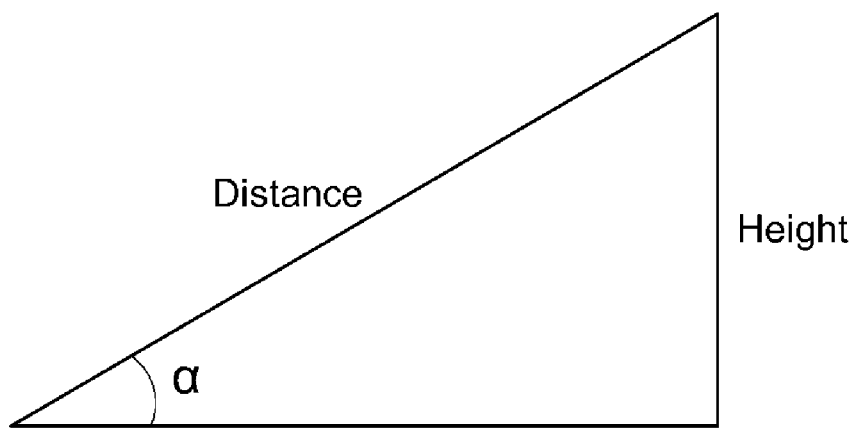
FIG. 9 is a view for explaining a method of calculating a gradient of a road surface from altitude information according to an exemplary embodiment of the present invention.

Meanwhile, FIG. 9 is a view for explaining a method of calculating a road surface gradient from altitude information, and a road surface gradient may be calculated from the following equation using altitude information and vehicle speed information obtained at a predetermined period.

Road surface gradient=(current altitude−previous altitude)/distance

Here, the distance may be calculated from an equation of (current vehicle speed×current time−previous vehicle speed×previous time).

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling an active air flap, the apparatus comprising:
    a global positioning system (GPS) receiver for receiving GPS signal;
    a data storage in which map information is stored;
    a controller for detecting a vehicle location from the GPS signal received through the GPS receiver, acquiring a gradient of a road surface corresponding to the vehicle location from the map information, and outputting a control signal for setting an opening degree of an air flap to a setting value according to the gradient of the road surface; and
    an actuator for actuating the air flap according to the control signal of the controller,
    wherein the controller further acquires intake air negative pressure detected by an intake air negative pressure detector, outputs a control signal for controlling an opening degree of the air flap with an opening degree setting value obtained according to the intake air negative pressure together with the road surface gradient, and
    wherein the opening degree setting value is set to a value for a fully closed state in a range in which the intake air negative pressure is a first reference pressure or more, and the opening degree setting value of the air flap decreases as the intake air negative pressure increases in a range in which the intake air negative pressure is more than a second reference pressure.

2. The apparatus of claim 1, further comprising:
    at least one of an exterior air temperature detector for detecting a temperature of exterior air;
    a vehicle speed detector for detecting a vehicle speed; and
    a water temperature detector for detecting a temperature of cooling water,
    wherein the controller outputs a control signal for controlling an opening degree of the air flap with an opening degree setting value obtained according to at least one detection information element selected from the exterior air temperature, the vehicle speed, and the temperature of cooling water, together with the road surface gradient and the intake air negative pressure.

3. The apparatus of claim 2, wherein the controller outputs a control signal for controlling the opening degree of the air flap with a maximum value of an opening degree setting value obtained according to the road surface gradient, an opening degree setting value obtained according to the intake air negative pressure, and an opening degree setting value obtained according to the detection information.

4. A method of controlling an active air flap, the method comprising:
    detecting a location of a vehicle from a global positioning system (GPS) signal received through a GPS receiver, and acquiring a road surface gradient of a road on which the vehicle travels from location information of the vehicle and map information stored in a data storage, by a controller;
    determining an opening degree setting value corresponding to the road surface gradient of the road, by the controller;
    outputting a control signal for controlling an opening degree of an air flap according to a setting value, by the controller; and
    controlling the opening degree of the air flap by operating an actuator according to the control signal,
    wherein the controller further acquires an intake air negative pressure detected by an intake air negative pressure detector, outputs a control signal for controlling an opening degree of the air flap with an opening degree setting value obtained according to the intake air negative pressure together with the road surface gradient, and
    wherein the opening degree setting value is set to a value for a fully closed state in a range in which the intake air negative pressure is a first reference pressure or more, and the opening degree setting value of the air flap decreases as the intake air negative pressure increases in a range in which the intake air negative pressure is more than a second reference pressure.

5. The method of claim 4, wherein the controller further acquires at least one detection information element selected from a temperature of exterior air detected by an exterior air temperature detector, a vehicle speed detected by a vehicle speed detector, and a temperature of cooling water detected by a water temperature sensor, and outputs a control signal for controlling an opening degree of the air flap with an opening degree setting value obtained according to at least one detection information element selected from the exterior air temperature, the vehicle speed, the intake air negative pressure, and the temperature of cooling water, together with the road surface gradient and the intake air negative pressure.

6. The method of claim 5, wherein the controller outputs a control signal for controlling the opening degree of the air flap with a maximum value of an opening degree setting value obtained according to the road surface gradient and an opening degree setting value obtained according to the detection information.

7. The method of claim 4, wherein on an uphill road a road surface gradient of which is a positive value, when the road surface gradient is a first reference gradient or more, the opening degree setting value of the air flap is a value for a fully opened state, and when the road surface gradient is less than the first reference gradient, the opening degree setting value increases as the road surface gradient increases.

8. The method of claim 4, wherein on a downhill road a road surface gradient of which is a negative value, when an absolute value of the road surface gradient is an absolute value of a second reference gradient or more, the opening degree setting value of the air flap is set to a value for a fully closed state, and when the absolute value of the road surface gradient is less than the absolute value of the second reference gradient, the opening degree setting value increases as the absolute value of the road surface gradient decreases.

9. The method of claim 4, wherein the opening degree setting value on the downhill road is set to be smaller than the opening degree setting value on the uphill road.

10. The method of claim 4, wherein the opening degree setting value of the air flap is set to a value for a fully opened state in a range in which the intake air negative pressure is the second reference pressure or less.

* * * * *